US009379856B2

(12) United States Patent
Khoryaev et al.

(10) Patent No.: US 9,379,856 B2
(45) Date of Patent: Jun. 28, 2016

(54) SYNCHRONIZING PEER-TO-PEER OPERATION FOR OUTSIDE NETWORK COVERAGE AND PARTIAL NETWORK COVERAGE USING LTE AIR INTERFACE

(71) Applicant: INTEL IP CORPORATION, Santa Clara, CA (US)

(72) Inventors: Alexey Khoryaev, Nizhy Novogorod (RU); Sergey Panteleev, Nizhy Novogorod (RU); Mikail A. Shilov, Nizhy Novogorod (RU); Debdeep Chatterjee, Santa Clara, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 102 days.

(21) Appl. No.: 14/226,592

(22) Filed: Mar. 26, 2014

(65) Prior Publication Data
US 2015/0009949 A1 Jan. 8, 2015

Related U.S. Application Data

(60) Provisional application No. 61/843,826, filed on Jul. 8, 2013.

(51) Int. Cl.
*H04W 56/00* (2009.01)
*H04L 5/00* (2006.01)
(Continued)

(52) U.S. Cl.
CPC .............. *H04L 5/0007* (2013.01); *H04L 5/005* (2013.01); *H04L 5/0073* (2013.01); *H04W 8/005* (2013.01); *H04W 28/048* (2013.01); *H04W 28/08* (2013.01); *H04W 40/246* (2013.01);
(Continued)

(58) Field of Classification Search
CPC .......... H04W 56/002; H04W 56/0005; H04W 56/001; H04W 56/0045; H04W 84/18; H04W 72/0446; H04W 72/042; H04W 74/0833
USPC .......................... 370/330, 329, 331, 336, 252
See application file for complete search history.

(56) References Cited

U.S. PATENT DOCUMENTS

2010/0136997 A1    6/2010  Palanki et al.
2010/0260079 A1*  10/2010  Baldemair ........ H04W 74/0833
                                                                         370/280

(Continued)

FOREIGN PATENT DOCUMENTS

WO    2013/077684 A1    5/2013

OTHER PUBLICATIONS

International Search Report with Written Opinion received for PCT Patent Application No. PCT/US2014/044863, mailed on Sep. 23, 2014, 11 pages.

*Primary Examiner* — Jamal Javaid
(74) *Attorney, Agent, or Firm* — Stoel Rives LLP

(57) ABSTRACT

A user equipment (UE) enables synchronous peer-to-peer communication between devices for out of network coverage and partial network coverage scenarios. The UE performs a synchronization procedure and selects a spectrum resource within an uplink (UL) spectrum for device-to-device (D2D) communication. The UE, representing a synchronization source, generates timing information and synchronization signals for synchronizing a group of wireless communication devices (peer UEs) with the UE in a local synchronization area. The UE transmits, in selected or pre-allocated time or frequency resources, a synchronization signal including the timing information in order to synchronize devices in the local synchronization area.

25 Claims, 8 Drawing Sheets

(51) Int. Cl.
*H04W 48/16* (2009.01)
*H04W 72/08* (2009.01)
*H04W 28/04* (2009.01)
*H04W 84/18* (2009.01)
*H04W 28/08* (2009.01)
*H04W 40/24* (2009.01)
*H04W 80/04* (2009.01)
*H04W 88/02* (2009.01)
*H04W 8/00* (2009.01)

(52) U.S. Cl.
CPC ............ *H04W48/16* (2013.01); *H04W 56/002* (2013.01); *H04W 72/082* (2013.01); *H04W 80/04* (2013.01); *H04W 84/18* (2013.01); *H04W 88/02* (2013.01); *Y02B 60/50* (2013.01)

(56) References Cited

U.S. PATENT DOCUMENTS

| | | | |
|---|---|---|---|
| 2011/0190017 A1* | 8/2011 | Kwon | H04W 52/146 455/509 |
| 2012/0134456 A1* | 5/2012 | Li | H04W 56/00 375/356 |
| 2013/0083779 A1 | 4/2013 | Ahn et al. | |
| 2013/0148566 A1 | 6/2013 | Doppler et al. | |
| 2013/0170470 A1 | 7/2013 | Kneckt et al. | |
| 2013/0308554 A1* | 11/2013 | Ngai | H04B 7/0404 370/329 |

* cited by examiner

SYNCHRONIZING PEER-TO-PEER OPERATION FOR OUTSIDE NETWORK COVERAGE AND PARTIAL NETWORK COVERAGE USING LTE AIR INTERFACE

RELATED APPLICATIONS

This application claims the benefit under 35 U.S.C. §119 (e) of U.S. Provisional Application No. 61/843,826, filed Jul. 8, 2013, which is hereby incorporated by reference herein in its entirety.

TECHNICAL FIELD

The present disclosure relates to direct device-to-device communication and, in particular, to outside network coverage and partial network coverage scenarios using Long Term Evolution (LTE) air interface for interference management and scheduling.

DETAILED DESCRIPTION OF PREFERRED EMBODIMENTS

Figure 1:
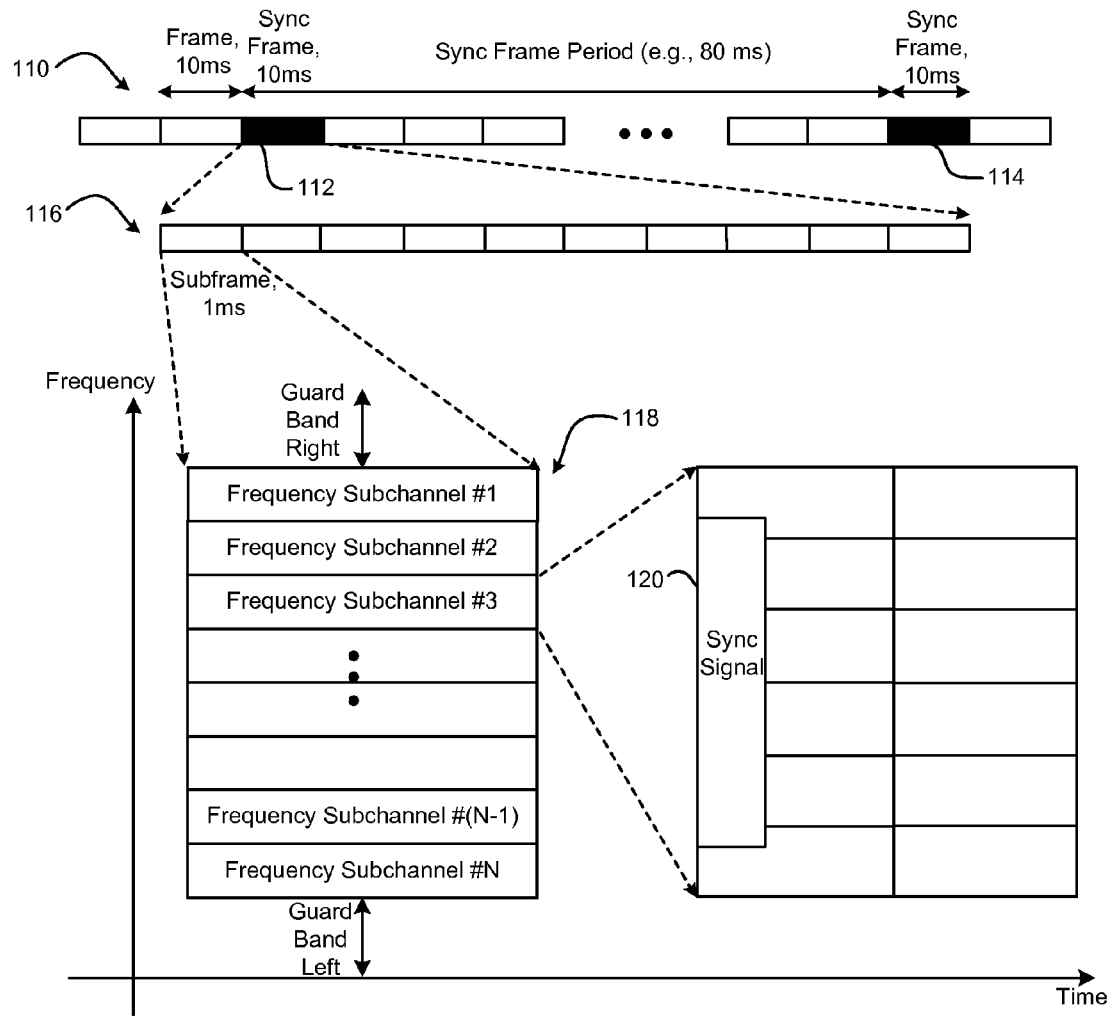
FIG. 1 is a block diagram illustrating example uplink spectrum resources partitioning for peer-to-peer synchronization according to one embodiment.

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Wireless mobile communication technology uses various standards and protocols to transmit data between a base station and a wireless communication device. Wireless communication system standards and protocols can include, for example, the 3rd Generation Partnership Project (3GPP) Long Term Evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP LTE radio access networks (RANs), the base station can include Evolved Universal Terrestrial Radio Access Network (E-UTRAN) Node Bs (also commonly denoted as evolved Node Bs, enhanced Node Bs, eNodeBs, or eNBs), and/or Radio Network Controllers (RNCs) in an E-UTRAN, which communicate with a wireless communication device, known as user equipment (UE).

LTE networks include radio access technology and core radio network architecture that provide high data rate, low latency, packet optimization, and improved system capacity and coverage. In LTE networks, an E-UTRAN includes a plurality of eNodeBs and communicates with a plurality of UEs. A downlink (DL) transmission in an LTE network can be defined as a communication from the eNodeB to a UE, and an uplink (UL) transmission can be defined as a communication from the UE to the eNodeB.

There are various applications and use cases proposed in 3GPP which may involve network initiated or UE initiated communication to or among a group of users and/or devices. In current LTE standard development, device-to-device (D2D) (also referred to herein as "peer-to-peer" or "P2P") communication is one field for enhancement for future releases (e.g., Release 12 and later versions) where UEs are able to communicate directly with other UEs without routing communications via an eNodeB or the core network. D2D has been proposed for local social networks, content sharing, location based marketing, serving advertisements, mobile to mobile applications, public safety, etc. D2D communications are of interest due to their ability to reduce load on a core network or access network, increase data rates due to direct and short communication paths, provide public safety communication paths, and provide other functionality.

By way of example, public safety demands for direct communication have motivated the study of peer-to-peer communication solutions based on the LTE air-interface. One of the challenging public safety requirements is to enable direct communication for outside of network coverage scenarios. A difference of this scenario from traditional LTE deployment scenarios is that there is no eNodeB available. The eNodeB provides multiple functional roles such as synchronization and radio resource management. LTE technology defines fully synchronous operation between an eNodeB and UEs. A mobile terminal (e.g., UE) synchronizes to the eNodeB synchronization and reference signals. In addition, the UE operation is configured by the eNodeB, and the UE terminal follows eNodeB instructions and commands in terms of spectrum resource management.

Synchronous operation uses synchronization in absolute time among UE terminals or relative to the terminal providing the reference synchronization signals. Because it is already supported by UE terminals, the inventors of the present application have recognized that the extension of synchronous operation is a useful design choice for out of network coverage and partial network coverage scenarios. However, establishing synchronization for out of coverage scenarios is not a simple technical problem and may suffer from multiple sources of errors that can result in non-accurate synchronization. One of the challenges, for example, is that public safety scenarios assume rather large incident areas where multiple first responder groups may operate simultaneously (e.g., in response to earthquake, forest fire, etc.). In this case, the synchronization may need to be established over a large geographical area using an air interface.

A solution to establish common synchronization is to use a common reference source for all devices. In particular, Global Navigation Satellite System (GNSS) based solutions, such as the Global Positioning System (GPS), Global Navigation Satellite System (GLONASS), Galileo, or Beidou, may be considered for providing a reliable reference source. However, due to generally poor performance of GNSS devices in indoor environments, as well as for security reasons (GNSS solutions are generally owned by individual countries), such solutions may not always be always appropriate. Therefore, alternative design approaches are needed for the out of coverage and partial network coverage scenarios.

In certain embodiments disclosed herein, methods are provided for enabling synchronous operation for out of coverage public safety specific scenarios. In particular, a system level solution is provided to reduce collision and synchronization errors among public safety terminals and establish synchronous operation over large geographical areas. It should be understood, however, that the public safety scenarios are provided by way of example only, and that the disclosed embodiments may be used in any number of scenarios, including commercial, government, and private use scenarios.

Synchronous operation provides for capacity, energy efficiency, and long range communication ability, which are useful for public safety. In dense ad-hoc networks that are typical for the public safety specific use cases, the communication rate and range is often limited by interference from multiple transmission points that are not synchronized to each other. The lack of synchronization creates strong mutual interference to intended receivers. In addition, such asynchronous networks are not power efficient because terminals may need to continuously or frequently monitor the medium in order to receive a signal in which the transmission time is unknown a priori.

To avoid the mentioned drawbacks, certain embodiments disclosed herein synchronize the operation of public safety terminals involved in (or responding to) a common incident. A synchronization protocol may be used to establish synchronous operation of mobile public safety terminals in proximity areas for out of coverage and partial coverage scenarios. In the synchronization protocol, one or more public safety devices, referred to herein as peer radio heads (PRH) or D2D synchronization sources, play the role of the synchronization reference for the remaining terminals in the surrounding area. These PRH terminals or D2D synchronization sources may facilitate maintaining the synchronous operation in the neighboring geographical areas and provide synchronous or quasi-synchronous operation over large geographical areas.

The protocol, according to certain embodiments, may also facilitate the collision free communication among multiple public safety groups (broadcast and groupcast) operating close to each other and distributed over large incident areas to perform their public safety missions. The synchronization protocol ensures that neighboring proximity areas operate synchronously by using a local synchronization protocol with hierarchical timing propagation.

The example public safety use cases assume multiple direct groupcast and/or broadcast transmissions among the public safety terminals serving in a particular incident area. There may be multiple public safety groups that work in nearby or even the same geographical area and that may need to have reliable communication between each other as well as reliable discovery of each other or even members of the other groups.

To provide concurrent communication among different user groups, certain embodiments use collision avoidance algorithms so that members of different groups can access the medium and not interfere with each other. It may also be useful to provide terminals a low power consumption and a long communication range. Thus, in certain embodiments, the LTE system bandwidth is divided into multiple frequency subchannels (frequency sub-bands), which can be used for data transmission and by default owned (i.e., reserved) by the members of the particular public safety group. In addition or in other embodiments, one or more of the public safety specific devices, referred to as PRHs or D2D synchronization sources, serve as a synchronization reference point that broadcasts synchronization signals in order to establish synchronous operation and provide energy savings for terminals that belong to the particular public safety group(s) served by given PRH(s).

In the following sections, example embodiments are described with respect to the figures, which form a part hereof, and which show, by way of illustration, specific embodiments or processes in which the embodiments may be practiced. Where possible, the same reference numbers are used throughout the drawings to refer to the same or like components. The following sections describe spectrum partitioning and multiple synchronization subchannels, aggregation and/or concatenation of frequency subchannels (including synchronization areas and extension of synchronization areas), synchronization mechanisms based on hierarchical timing propagation, timing grade information, synchronization signal structure, broadcast channel description, and synchronization procedures.

I. Spectrum Partitioning and Multiple Synchronization Subchannels

Unlike the situation where an eNodeB provides synchronization and reference signals in downlink (DL) carrier resources, certain embodiments disclosed herein define uplink (UL) carrier resources that a UE (e.g., configured as a PRH or synchronization source) uses to transmit synchronization signals to peer UEs for direct communications.

FIG. 1 is a block diagram illustrating example UL spectrum resource partitioning for peer-to-peer synchronization according to one embodiment. This example is provided for frequency division multiplexing (FDM) embodiments. However, as discussed below, other embodiments may provide for time division multiplexing (TDM) or combinations of FDM and TDM. As shown in FIG. 1, a plurality of UL frames 110 includes synchronization (sync) frames 112, 114 at a predetermined sync frame period. The sync frames 112, 114 are each divided into a plurality of UL subframes 116. According to the illustrated example, each UL frame 110 has a duration of 10 milliseconds (ms), the start of the sync frames are separated in time by 80 ms (e.g., the sync frame period is 80 ms), and each subframe has a duration of 1 ms. Skilled persons will recognize, however, that other frame durations, sync frame periods, and subframe durations may also be used.

According to the illustrated example, the LTE system bandwidth is divided into N logical frequency subchannels 118. In other embodiments, the spectrum resources can be divided into time subchannels or time-frequency subchannels. A synchronization signal (sync signal) 120 is included within one of the frequency subchannels. As shown in the example of FIG. 1, frequency subchannel #3 includes the sync signal 120. In FDM embodiments, each logical frequency subchannel 118 is composed from multiple (M) physical resource blocks (PRBs). In TDM embodiments, the resources may be divided into time slots, subframes or frames instead of frequency subchannels. In other embodiments, a combination of both frequency subchannels and time slots or subframes may be used. In certain embodiments, the FDM partitioning of the resources is more advantageous than TDM partitioning because operation of multiple public safety groups within the neighboring areas may happen to be non-synchronized. In the general case illustrated in FIG. 1, the FDM partitioning may reduce interference (collision) as compared to the TDM alternative in case of asynchronous areas. In addition, the sub-channelization gain can be extracted when the terminal transmits at maximum power in the subset of the overall frequency resources. The term "logical frequency channel" is used here to indicate that actual mapping of logical frequency resources to physical resource elements of the LTE system may be subject to any resource permutation or resource hopping function, although the orthogonality of physical resources is still preserved.

A function of a PRH device or a synchronization source is to establish a local synchronization area within a given radius (determined by transmission range of the synchronization signal 120). The public safety terminals (UEs) that are within synchronization range can receive the synchronization signal 120 from the given PRH or synchronization source and establish a common timing reference so that their subsequent transmissions and/or operations are aligned in time and frequency. Therefore, terminals can achieve synchronization in time and frequency and thus synchronous communication becomes feasible. In certain embodiments, the established synchronization can be used by upper layer protocols for capacity and energy efficient transmission.

In certain embodiments, the transmission period of the synchronization signal 120 (i.e., the sync frame period) is a tradeoff between clock drift (frequency stability) and power consumption. More accurate (stable) oscillators installed in the public safety devices may require longer sync frame periods. From the physical layer perspective, the sync frame period may be selected to keep the synchronization error within a small part of the cyclic prefix (CP) duration (e.g., ⅛ or ¼ of CP time) to prevent asynchronous interference. At the same time, small sync frame periods increase the power consumption because the PRHs and other public safety terminals would need to more frequently monitor the transmission of the synchronization signal 120. In order to balance these two factors, the synchronization signal 120 can be transmitted periodically once per L frames.

The frame where the synchronization signal 120 is transmitted is called a synchronization frame 112. To be more specific, using LTE terminology, the synchronization signal 120 may be transmitted in the set of subframes 116 of the synchronization frame 112. FIG. 1 shows an example when the synchronization signal 120 is transmitted every 80 ms. (i.e., L=8 LTE frames). It should be noted that the synchronization procedure described above assumes synchronization at the physical layer so that multiple concurrent transmissions within given geographical area do not cause inter-carrier interference, appearing when transmissions are not time aligned. On the other hand, the synchronization requirement may be relaxed such as to achieve synchronization at the upper layers only, but admit asynchronous transmissions from the physical layer perspective. In the latter case, the synchronization error requirements may be relaxed substantially.

When multiple public safety groups compete for resources, certain embodiments also orthogonalize transmission of the synchronization signal 120 in frequency, in time, or in both frequency and time domains. The orthogonalization in time can facilitate simple synchronization techniques between multiple PRHs (i.e., between multiple synchronization sources). The orthogonalization in frequency can facilitate more reliable transmission and interference management. In case of frequency orthogonalization, the frequency channel for synchronization signal transmission can be either pre-configured or selected by the PRH or synchronization source during the scanning procedure. In embodiments of the latter case, the PRH or synchronization source scans all available frequency channels before establishing its own synchronization in a particular frequency channel. As a result of the scanning procedure, the PRH or synchronization source selects the frequency channel where the received power of a synchronization signal (e.g., from another synchronization source) has a minimum value or where a synchronization signal is not detectable. In other embodiments, the PRH or synchronization source can select the time or time-frequency subchannel when executing a scanning procedure. In these embodiments, the scanning may be simplified since the terminal does not need to scan multiple frequencies. However, if there is not enough time resources, the additional frequency dimension can be used to further improve performance.

In certain embodiments, other criteria are also used for selection of the synchronization (frequency) channel. According to one embodiment, for example, the PRH or synchronization source may select the frequency subchannel which is least congested from its receiver perspective. Note that once the synchronization channel is selected, the spectrum resources of this logical frequency channel are associated with or owned (i.e., reserved) by given PRH node or synchronization source.

II. Aggregation/Concatenation of Frequency Subchannels

The division of frequency subchannels enables collision free operation when multiple PRHs or synchronization sources establish synchronization areas in geographically overlapping regions. Depending on the scenario, there may be a plurality of PRHs or synchronization sources detectable in a given area. In this case, the remaining non-occupied resources may be shared between deployed PRHs or synchronization sources. Certain embodiments use non-default frequency subchannels to increase throughput for D2D operation within the given synchronization area and at the same time control interference between devices that belong to different synchronization areas. In certain embodiments, a UE may autonomously select itself (i.e., self-configuration) to act as a PRH or synchronization source based on detection of synchronization signals (and/or lack thereof). For out of network coverage scenarios, for example, an autonomous selection and reselection of mobile synchronization sources may be used. In other embodiments, such as in network coverage or certain partial network coverage scenarios, an eNodeB may assign UEs to serve as PRHs or synchronization sources.

A. Synchronization Areas

In certain embodiments, each PRH or synchronization source establishes its own local synchronization area to provide common reference timing for multiple devices (UEs) located within its synchronization range, and thus associated to the PRH or synchronization source. In a simple case, the term "associated" means that UEs (e.g., public safety terminals) follow the synchronization signal transmitted by a given PRH or synchronization source, and use a derived timing based on the synchronization signal for their own operation. In other cases, the term "associated" means that UEs (e.g., public safety terminals) perform an access procedure, and that the PRH or synchronization source assists in radio resource management functions as well.

Figure 2A:
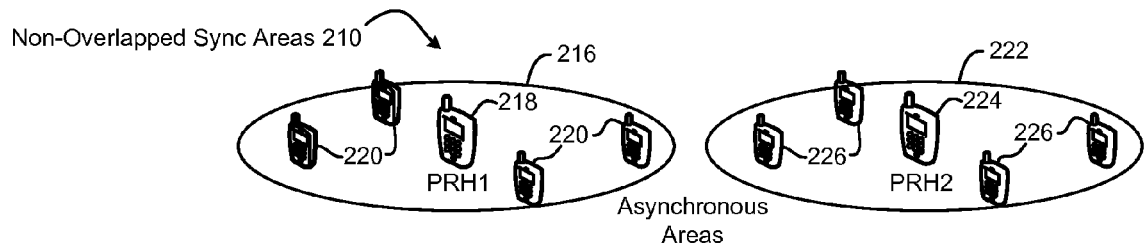
FIGS. 2A, 2B, and 2C are block diagrams illustrating non-overlapped, partially overlapped, and overlapped scenarios that may result from a synchronization protocol according to certain embodiments.
Figure 2B:
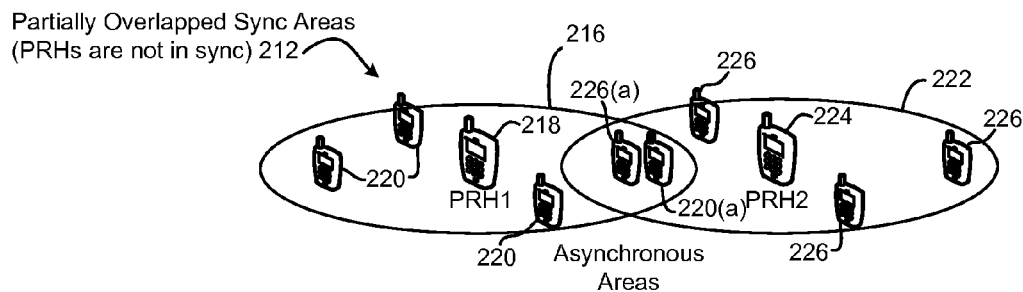
Figure 2C:
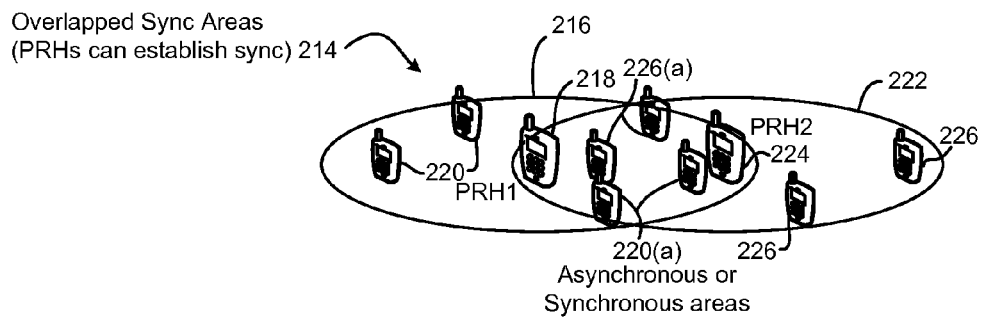

FIGS. 2A, 2B, and 2C are block diagrams illustrating non-overlapped 210, partially overlapped 212, and overlapped 214 scenarios that may result from the described synchronization protocol according to certain embodiments. As shown, a first synchronization area 216 includes a first UE 218 configured as (e.g., autonomously selected or self-configured as) a synchronization source (PRH1) to provide a synchronization signal to a first group of UEs 220, and a second synchronization area 222 includes a second UE 224 configured as (e.g., autonomously selected or self-configured as) a synchronization source (PRH2) to provide synchronization signals to a second group of UEs 226.

FIG. 2A shows non-overlapped 210 synchronization areas 216, 222, wherein PRH1 is not synchronized in time with PRH2. Accordingly, the first synchronization area 216 and the second synchronization area 222 are asynchronous with one another. Further, in the non-overlapped 210 case, there are no UEs 220, 226 that can synchronize to both PRH1 and PRH2.

FIG. 2B shows partially overlapped 212 synchronization areas 216, 222, wherein PRH1 is also not synchronized in time with PRH2 (as in FIG. 2A). Accordingly, the first synchronization area 216 and the second synchronization area 222 are asynchronous with one another. In FIG. 2B, however, UEs 220(a) and 226(a) within an overlapped region of synchronization areas 216 and 222 can detect synchronization signals from both PRH1 and PRH2 and are able to synchronize to either of them. The UEs 220(a) and 226(a) within the overlapped region can also facilitate establishment of synchronization between PRH1 and PRH2, if required or configured to do so. Also, if the UE 220(a) and/or the UE 226(a) detect that both PRH1 and PRH2 occupy the same frequency channel, the UE 220(a) and/or the UE 226(a) can request either PRH1 or PRH2 to change frequency channels to avoid resource collisions and strong interference during the data transmission. Alternatively, the UE 220(a) or the UE 226(a) can transmit its own synchronization signals using the timing of one of the selected PRHs (PRH1 or PRH2), and thus can facilitate establishment of common synchronization between PRH1 and PRH2.

FIG. 2C shows overlapped 214 synchronization areas 216, 222, wherein both PRH1 and PRH2 can detect and synchronize to each other to thereby establish a common reference source. Thus, the first synchronization area 216 and the second synchronization area 222 may become synchronous with each other. In certain embodiments, as discussed below, this is done by selecting one of PRH1 or PRH2 as a common reference source.

B. Extension of Synchronization Areas

When synchronization areas of two PRHs or two synchronization sources are overlapped (as shown in FIG. 2C), the PRHs or synchronization sources can establish common timing by selecting one of the PRHs or synchronization sources as a common synchronization source. In this case, after a re-synchronization procedure, the whole extended area (i.e., both synchronization areas) operates synchronously.

Figure 3A:
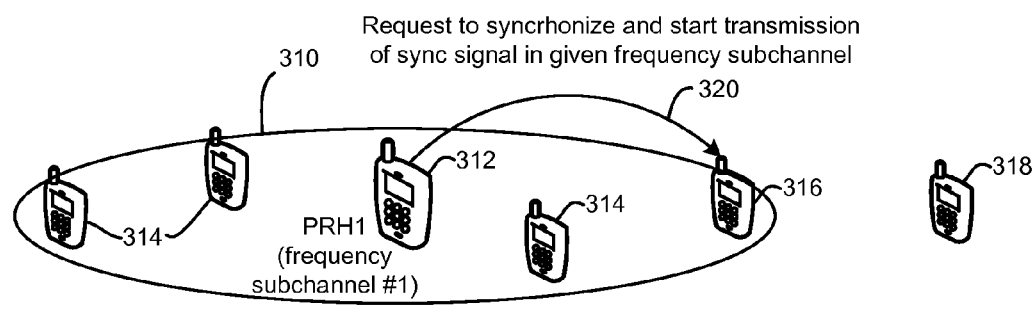
FIGS. 3A and 3B are block diagrams illustrating extension of a synchronization area according to one embodiment.
Figure 3B:
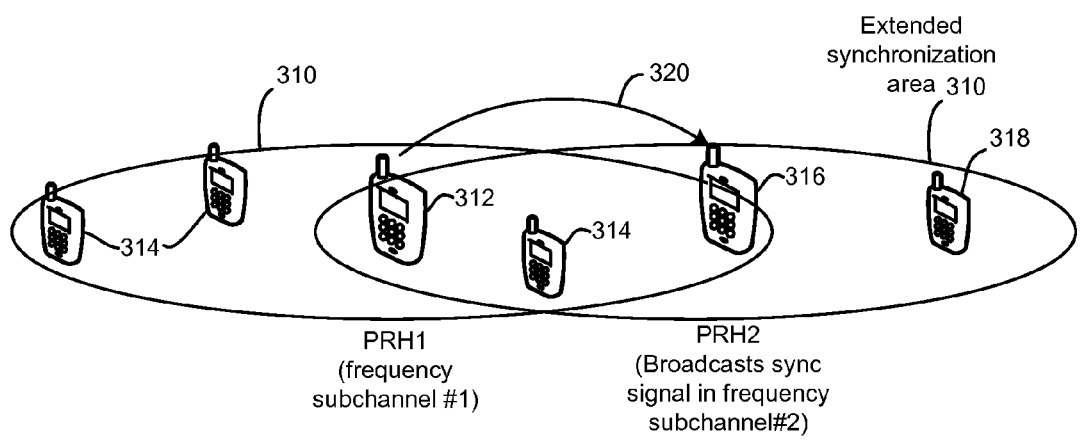

In addition, or in other embodiments, a PRH or synchronization source may send a request to one or more of the UEs in its synchronization area to start broadcasting synchronization signals in order to extend the synchronization area. For example, FIGS. 3A and 3B are block diagrams illustrating extension of a synchronization area 310 according to one embodiment. In this example, the synchronization area 310 includes a UE 312 configured as (e.g., autonomously selected or self-configured as) a synchronization source (PRH1) to provide a first synchronization signal to a group of UEs 314, 316. As shown in FIG. 3A, however, a UE 318 is located outside of the synchronization area 310. In other words, the UE 318 is beyond the range of receiving the first synchronization signal from PRH1.

In certain embodiments, the UE 316 within the synchronization area 310 is configured to detect the UE 318 outside synchronization area 310, and the UE 316 responds by notifying PRH1 of the presence of the UE 318. In other embodiments, the UE 316 may receive a request from the UE 318 to join the group of UEs 312, 314, 316, and the UE 316 forwards the request to PRH1. In response, PRH1 sends a request 320 to the UE 316 to synchronize itself based on the first synchronization signal received on a first frequency subchannel (frequency subchannel #1) or time slot and to start transmission of the synchronization signal in a second frequency subchannel (frequency subchannel #2) or time slot. The UE 316 responds to the request by transmitting a second synchronization signal in the same synchronization frame as the first synchronization signal received from PRH1. Thus, the UE 316 becomes a D2D synchronization source (PRH2) that extends the synchronization area 310 to the UE 318, as shown in FIG. 3B. PRH2 derives synchronization (timing) for the second synchronization signal from the first synchronization signal received from PRH1. Accordingly, the UE 318 uses the second synchronization signal received from PRH2 to synchronize with the group of UEs 312, 314, 316.

III. Synchronization mechanisms based on hierarchical timing propagation

To expand the geographical areas of synchronous D2D operation, different synchronization mechanisms can be applied. However, in certain embodiments, the number of hops (i.e., propagation of timing information from one PRH to another) is limited because synchronization timing error accumulates from hop to hop). This may be illustrated in two example embodiments where timing propagation is based on time of arrival measurements or round trip time measurements.

Figure 4A:
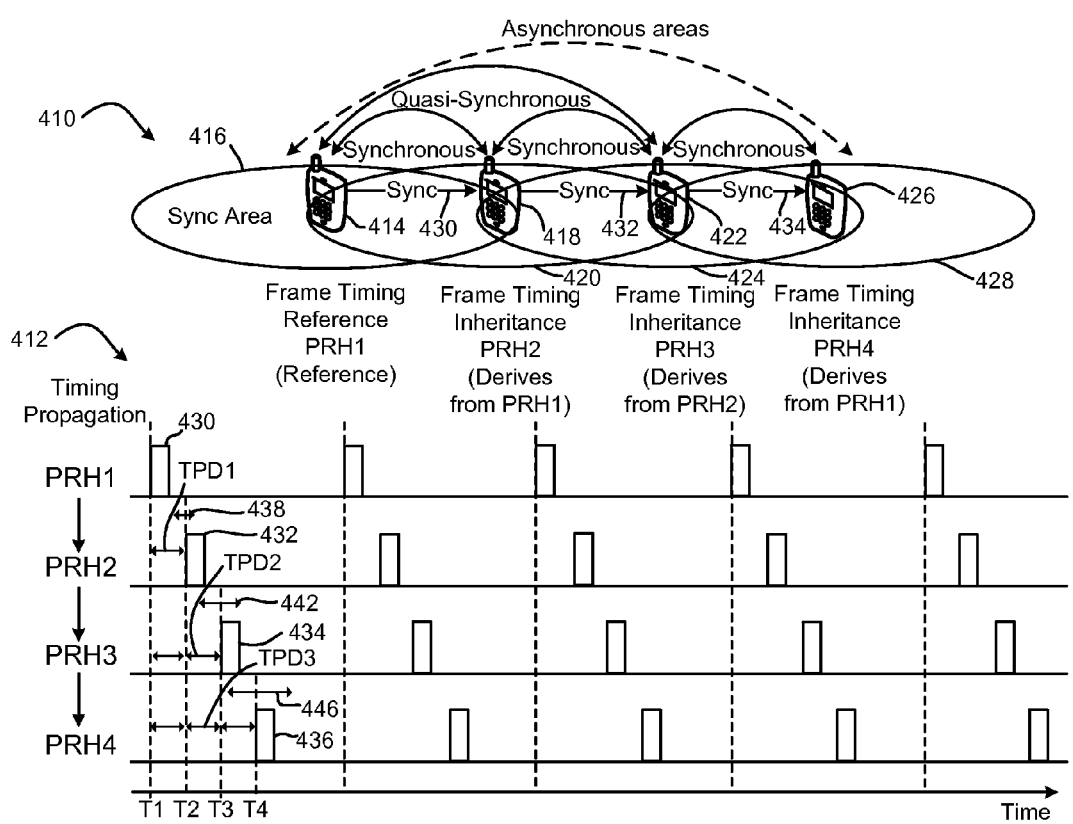
FIG. 4A includes a block diagram and timing graph illustrating timing propagation based on time of arrival measurements according to one embodiment.

In the first example embodiment, a PRH propagates synchronization timing information by measuring the time of arrival of a synchronization signal from another node. The estimated time of arrival is used as the timing instance relative to which the PRH transmits its own synchronization signals. For example, FIG. 4A includes a block diagram 410 and timing graph 412 illustrating timing propagation based on time of arrival measurements according to one embodiment. In FIG. 4A, a first UE 414 is configured as (e.g., autonomously selected or self-configured as) a first synchronization source (PRH1) with a range corresponding to a first synchronization area 416, a second UE 418 is configured as (e.g., autonomously selected or self-configured as) a second synchronization source (PRH2) with a range corresponding to a second synchronization area 420, a third UE 422 is configured as (e.g., autonomously selected or self-configured as) a third synchronization source (PRH3) with a range corresponding to a third synchronization area 424, and a fourth UE 426 is configured as (e.g., autonomously selected or self-configured as) a fourth synchronization source (PRH4) with a range corresponding to a fourth synchronization area 428.

In this example, PRH1 may be referred to as an independent synchronization source because it does not derive synchronization information from another node. PRH2, PRH3, and PRH4 may be referred to as dependent or regional synchronization sources because they each derive synchronization (timing) from another source. For example, PRH1 sends a first synchronization signal 430 to PRH2, PRH2 sends a second synchronization signal 432 to PRH3, and PRH3 sends a third synchronization signal 434 to PRH4. That is to say, PRH1 is an independent or overall reference source (top of the hierarchy) that generates frame timing information, PRH2 derives frame timing information from PRH1, PRH3 derives frame timing information from PRH2, and PRH4 derives frame timing information from PRH3.

Referring to the timing graph 412 of FIG. 4A, a first timing instance T1 is shown, relative to which PRH1 transmits the first synchronization signal 430. PRH2 measures the time of arrival of the first synchronization signal 430 at a second timing instance T2. PRH2 uses the measured second timing instance T2 as the time relative to which it transmits its own synchronization signal 432. Similarly, PRH3 measures the time of arrival of the synchronization signal 432, which it uses as a third timing instance T3 to which PRH3 transmits its synchronization signal 434. PRH4 measures receiving the synchronization signal 434 at a fourth timing instance T4 to which PRH4 transmits its synchronization signal 436.

A first propagation delay TPD1 is a time period between the first timing instance T1 and the second timing instance T2. Due to an amount of unknown delay within the first propagation delay TPD1, PRH2's timing estimate based on the time of arrival of the synchronization signal 430 includes a synchronization error variance 438. Similarly, a second propagation delay TPD2 is a time period between the second timing instance T2 and the third timing instance T3, which contributes to a second synchronization error variance 442. Finally, a third propagation delay TPD3 is a time period between the third timing instance T3 and the fourth timing instance T4, which contributes to a third synchronization error variance 446.

Figure 4B:
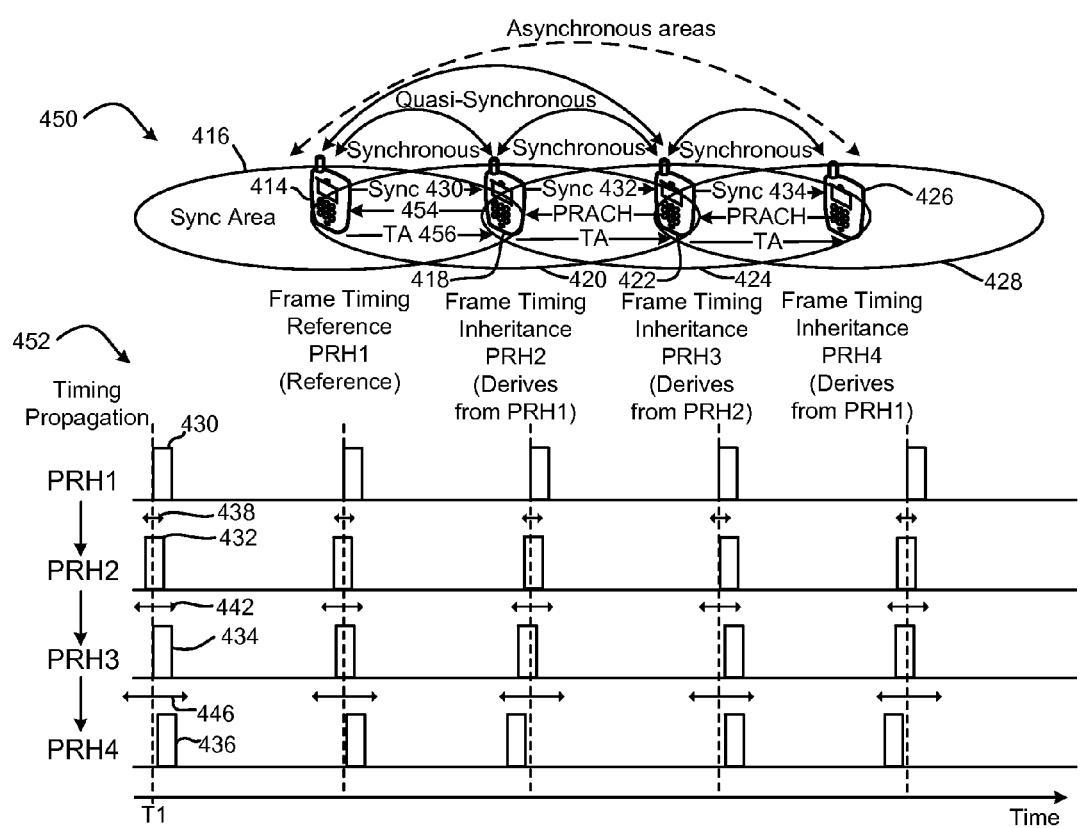
FIG. 4B includes a block diagram and timing graph illustrating timing propagation based on round trip time measurements according to one embodiment.

The example embodiment shown in FIG. 4A is relatively simple (e.g., it does not include propagation error compensation discussed with respect to FIG. 4B) and can be applied in practice for synchronous operation in neighboring areas. For example, the embodiment of FIG. 4A provides synchronous operation between area 416 and area 420, synchronous operation between area 420 and area 424, or synchronous operation between area 424 and area 428. The example embodiment may also provide quasi-synchronous operation between area 416 and area 424, which do not substantially physically overlap with one another (if at all). However the example method shown in FIG. 4A may suffer from biased timing due to the propagation delays TPD1, TPD2, and TPD3 between PRH1, PRH2, and PRH3, respectively, so that synchronization error grows with the amount of timing inheritance. Due to multiple timing estimates, the synchronization error variances 438, 442, and 446 increase with each hop so that distant synchronization areas such as area 428 may become asynchronous with the area 416 of the independent or overall synchronization source PRH1. It is noted that propagation delay for proximate communication may be neglected in certain embodiments since for practical communication ranges, e.g., up to 300 meters, the error due to propagation delay can be absorbed by the duration of the cyclic prefix.

In the second example embodiment, a PRH propagates synchronization timing information by compensating for propagation delay using round trip time measurements. For example, FIG. 4B includes a block diagram 450 and timing graph 452 illustrating timing propagation based on round trip time measurements according to one embodiment. In this example, the independent PRH1 transmits the first synchronization signal 430 relative to the first timing instance T1 and PRH2 responds with the time of arrival in a physical random access channel (PRACH) 454 or alternative synchronization signal, which allows PRH1 to calculate the round trip time. Skilled persons will recognize that PRACH is used by way of example only, and that any signal may be used to communicate time of arrival information to a synchronization source. PRH1 uses the time of arrival information received from PRH2 to estimate a round trip time, and then transmits a timing advance (TA) command 456 based on the estimated round trip time. PRH2 uses the TA command 456 to pre-compensate for estimated timing bias. The process is repeated for PRH3 and PRH4.

Thus, as shown in the timing graph 452 of FIG. 4B, PRH2, PRH3, and PRH4 use respective pre-compensated estimates of the first timing instance T1 as the time relative to which they transmit their respective synchronization signals 432, 434, 436. Similar to the time of arrival approach, however, the synchronization error variances 438, 442, 446 grow during hierarchical timing propagation over consecutive PRH hops. In certain embodiments, even higher synchronization error variance can be expected for timing propagation based on round trip time measurements than that expected based on time of arrival measurements because the number of measurements are doubled by performing time of arrival estimation twice (i.e., at the synchronization source and synchronization acquirer node).

IV. Timing Grade Information

As discussed in the previous section, when PRHs hierarchically derive (inherit) synchronization from each other, the synchronization timing error is increased. Therefore, after several hops the synchronization acquirer may become non-synchronous with the independent reference source. A dependent PRH may receive synchronization signals from two or more different PRHs. Linearly combining the different synchronization signals may lead to unstable behavior. Thus, in certain embodiments, the dependent PRH follows a set of rules to select which of the different synchronization signals to use to derive its own timing.

In one embodiment, a dependent PRH selects the synchronization signal associated with the lower number of hop count. For example, an independent PRH node prioritizes the derivation of the timing information from the independent PRH (which communicates that its synchronization hop count=0), instead of from a dependent PRH node (which communicates that its synchronization hop count>0) that has derived synchronization from another PRH. If a synchronization signal from the independent PRH is not available, then priority is given to the PRH that derives its timing with the lowest number of hops because it will likely have a lower synchronization error. Such prioritization may be useful, for example, if measurement errors for each hop are expected to be of the same order and to accumulate from hop to hop.

Figure 5:
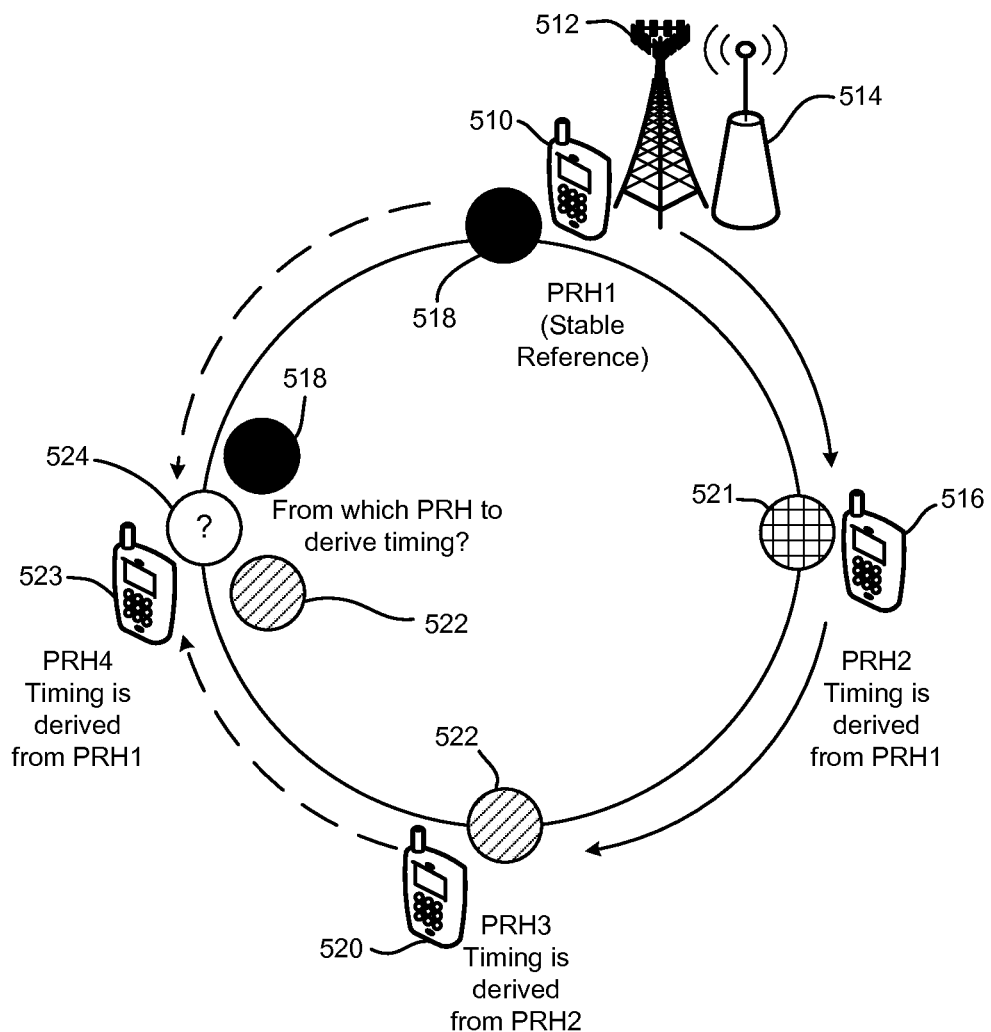
FIG. 5 is a block diagram illustrating selection of a synchronization source based on timing grade information according to one embodiment.

In addition, or in other embodiments, the dependent PRH node selects from a plurality of received synchronization signals based on actual propagation conditions. For example, FIG. 5 is a block diagram illustrating selection of a synchronization source based on timing grade information according to one embodiment. In this example, a first synchronization source 510 (PRH1) provides a stable timing reference. A hop count=0 for PRH1. The stable timing reference may be based on an internal timer and/or a GNSS signal. If available, the stable timing reference may also be based on a signal received from an eNodeB 512 and/or Wi-Fi access point 514. A second synchronization source 516 (PRH2) derives its timing from a first synchronization signal 518 transmitted by PRH1. The hop count=1 for PRH2. A third synchronization source 520 (PRH3) derives its timing from a second synchronization signal 521 transmitted by PRH2. The hop count=2 for PRH3.

In the example shown in FIG. 5, a fourth synchronization source 523 (PRH4) receives both the first synchronization signal 518 from PRH1 and the third synchronization signal 522 from PRH3. PRH4 selects 524 whether to synchronize to PRH1 (hop count=0) or PRH3 (hop count=2) as the reference source. To assist in the selection of the reference source, timing grade information is available to PRH4 for the communication channel between PRH1 and PRH4 and for the communication channel between PRH3 and PRH4. For example, the timing grade information may indicate that the received power of the synchronization signal 522 from PRH3 is much greater and/or includes less interference than the received power of the synchronization signal 518 from PRH1. Based on this determination, PRH4 may elect to derive its timing from PRH3, even though the number of synchronization hops associated with PRH3 is greater than the number of synchronization hops associated with PRH1. In other cases, the hop count can serve as a priority indicator (e.g., synchronization hop count has a high priority for PRH selection as a synchronization source). Alternatively, PRH4 can select as a synchronization source the terminal with an earlier time of arrival.

Depending on the implementation, the timing grade information may be represented by different types of information. For example, metrics may be used such as stability of the oscillator, signal-to-noise ratio, synchronization quality (e.g., error variance), and/or the amount of synchronization propagation hops used to derive the timing from the reference source. Based on the selected design option, the timing grade information may be encoded in multiple ways such as within the synchronization reference sequence, implicitly indicated by the physical position of the synchronization signal transmission, broadcasted over one of the physical channels, or transmitted in any other signal or channel.

V. Synchronization Signal Structure

In certain embodiments, the physical structure of the PRH synchronization signal is represented by the primary synchronization signal (PSS) and/or the secondary synchronization signal (SSS), which an eNodeB transmits in the DL direction for cell synchronization, to maximize the reuse of the existing signals defined in LTE technology. The PSS and SSS signals can be mapped to the center of the corresponding frequency subchannels. In other embodiments, however, the physical structure of the PRH synchronization signal may be different than the PSS and/or SSS signal structures and may be specifically designed for D2D operation for out of network coverage and partial network coverage scenarios.

In certain embodiments, the physical structure of a synchronization signal encodes the following information to enable synchronous operation for out of network coverage and partial network coverage scenarios: information about the PRH identity (similar to cell-ID to distinguish cell); frequency channel and default spectrum resources owned by a given PRH; and/or timing grade information or type of synchronization source.

For the case when timing grade information is represented by the amount of synchronization timing hops, the synchronization signal can be encoded by synchronization of sequence, by position of physical mapping to a spectrum resource (e.g., offset), or by a subset of SSS sequence or PSS/SSS combination. For example, a set of available SSS signals may be divided into N subsets, where N is the number of allocated frequency subchannels (see FIG. 1) or timeslots. Each SSS subset can be further divided into M sub-groups, where M is the maximum number of synchronization hops supported by the system. Depending on the number of synchronization hops, according to such an embodiment, the sequence from the corresponding subset is transmitted by a given PRH to indicate the inheritance (number of hops) in the synchronization signal.

For PRHs synchronized with each other, according to certain embodiments, their synchronization signals are transmitted within same time interval (e.g., subframes of the synchronization frame) to reduce the power consumption of the UEs that are capable to synchronize with multiple PRHs. These synchronization signals (e.g., PSS/SSS) may be transmitted with a low duty cycle that provides an improved or optimal tradeoff between clock drift, synchronization error, and PRH power consumption. In particular, a staggered transmission of synchronization signals (e.g., PSS/SSS) may be advantageous so that PRHs can scan frequency channels and track synchronization signals from each other to support common timing and quasi synchronous operation in the given geographical area.

VI. Broadcast Channel

In addition, or in other embodiments, a peer-to-peer broadcast and system information physical channel (P2PBSICH), or a physical P2P synchronization channel, is used to carry system information for establishing synchronous operation of the peer terminals. For example, the following information may be encoded and carried within the robust P2PBSICH channel: system frame number, a synchronization hop count (e.g., a current hop count or a maximum allowable hop count), and/or configuration of spectrum resources to be used for other D2D functions (e.g., resources used for discovery zone, broadcast zone resources, etc.). Additionally, it may carry information about synchronization source type.

The peer-to-peer broadcast and system information physical channel, according to one embodiment, is transmitted within resources of the dedicated frequency channel.

VII. Synchronization Procedure

Figure 6:
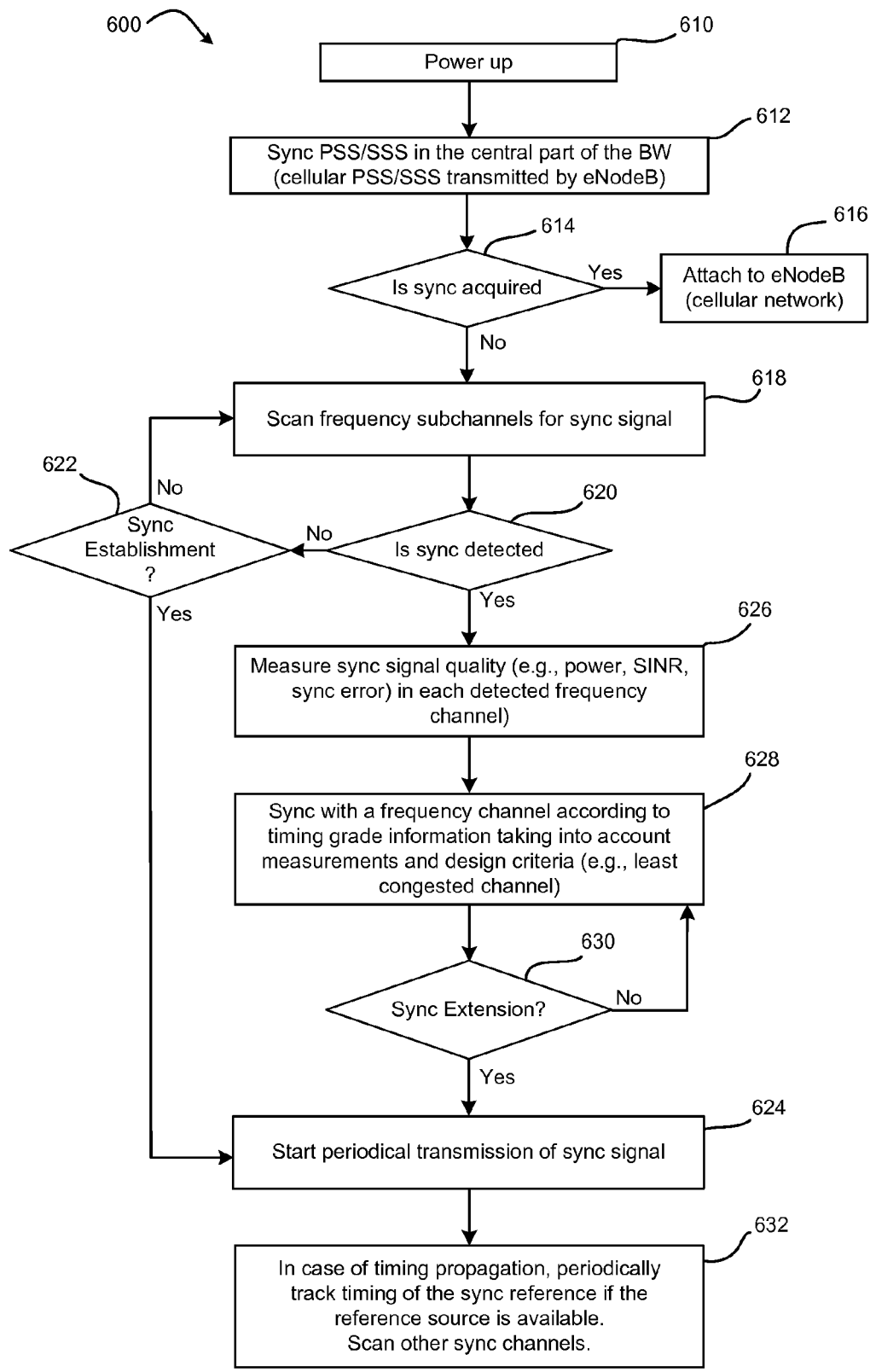
FIG. 6 is a flowchart of an example synchronization method according to one embodiment that enables D2D operation within network coverage as well as for out of network and partial network coverage scenarios.

FIG. 6 is a flowchart of an example synchronization method 600 according to one embodiment that enables D2D operation within network coverage as well as for out of network and partial network coverage scenarios. The method 600 includes, after powering up 610 a UE, synchronizing 612 PSS and/or SSS signals in the central part of the DL bandwidth. In other words, the UE scans resources in an attempt to detect the cellular PSS/SSS signals transmitted by an eNodeB. If available, the UE considers the eNodeB to be a primary synchronization source because of the stability of the eNodeB's oscillators and the connection that it provides to the cellular network. Thus, the UE queries 614 whether synchronization with the eNodeB is acquired and, if yes, the UE attaches to the eNodeB (cellular network).

If, however, synchronization with the eNodeB is not acquired, the UE scans 618 the UL frequency subchannels used for direct communication for a synchronization signal from a PRH or D2D synchronization source. The UE queries 620 whether such a synchronization signal is detected. If the UE does not detect a synchronization signal, the UE queries 622 whether it should establish a synchronization area for a group of UEs by starting 624 periodical transmission of its own synchronization signal. The determination of whether or not the UE should establish a synchronization area in the absence of other synchronization signals may be based on user input and/or pre-authorization to act as a PRH for the group of UEs. If the UE determines that it should not establish a synchronization area, the UE continues scanning 618 frequency subchannels for a synchronization signal from a PRH or synchronization source.

If the UE detects a synchronization signal from a PRH or synchronization source, the UE measures 626 synchronization signal quality (e.g., power, signal-to-interference-plus-noise ratio (SINR), synchronization error) in each detected frequency channel, and selectively synchronizes 628 with a frequency channel according to timing grade information taking into account measurements and design criteria (e.g., least congested channel). The UE may also query 630 whether it should provide synchronization extension (e.g., become a dependent PRH or synchronization source) to propagate the synchronization signal to other UEs. If yes, the UE starts 624 periodical transmission of its own synchronization signal. In the case of timing propagation, the UE periodically tracks 632 the synchronization reference signal that it receives, if the reference source is available. If the synchronization source becomes unavailable, then the UE scans other synchronization channels for an available reference source.

VIII. Example Mobile Device

Figure 7:
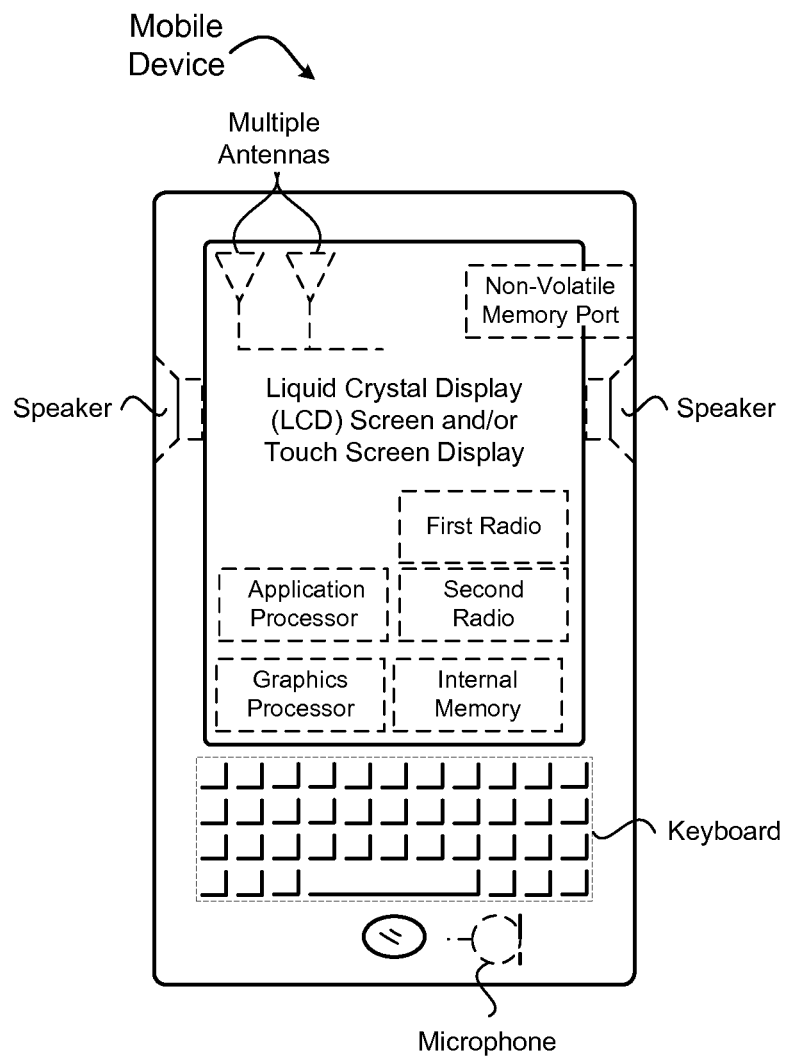
FIG. 7 is an example illustration of a mobile device according to certain embodiments.

FIG. 7 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA—), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 7 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

IX. Additional Example Embodiments

The following are examples of further embodiments:

Example 1 is a UE comprising processing circuitry to select a subchannel of an uplink (UL) subframe for device-to-device (D2D) communication. The subchannel of the UL subframe corresponding to carrier resources of an evolved universal terrestrial radio access network (E-UTRAN). The processing circuitry is also to generate timing information for synchronizing a group of wireless communication devices with the UE in a local synchronization area, and transmit, in the selected subchannel of the UL subframe, a synchronization signal comprising the timing information.

Example 2 includes the UE of Example 1, wherein the processing circuitry is further configured to receive, from a first wireless communication device in the group, a signal indicating detection of a second wireless communication device outside of the local synchronization area. In response to the signal, the processing circuitry is further configured to send a request to the first wireless communication device to extend the local synchronization area by retransmitting the synchronization signal. The UE becomes an independent synchronization source and the first wireless communication device becomes a regional synchronization source that depends from deriving synchronization from the UE.

Example 3 includes the UE of Example 1, wherein the processing circuitry is further configured to receive, from a first wireless communication device in the group, a signal indicating detection of a second wireless communication device outside of the local synchronization area, and that the first wireless communication device autonomously extends the local synchronization area by retransmitting the synchronization signal. The UE becomes an independent synchronization source and the first wireless communication device becomes a regional synchronization source that depends from deriving synchronization from the UE.

Example 4 includes the UE of Example 1, wherein the processing circuitry is further configured to receive, from a first wireless communication device in the group, a request to change the selected subchannel to a different subchannel, timeslot, or subframe to avoid interference with a remote synchronization area that at least partially overlaps with the local synchronization area. In response to the request, the processing circuitry is configured to change transmission of the synchronization signal to the different subchannel, timeslot, or subframe.

Example 5 includes the UE of Example 1, wherein the processing circuitry is further configured to determine interference with a remote synchronization area that at least partially overlaps with the local synchronization area, and autonomously change transmission of the synchronization signal to a different subchannel, timeslot or subframe.

Example 6 includes the UE of Example 1, wherein the UE is a first peer radio head configured as a first reference source in the local synchronization area. The processing circuitry is further configured to detect entry of a second peer radio head into the local synchronization area. The second peer radio head is configured as a second reference source in a remote synchronization area. The processing circuitry is configured to synchronize with the second radio head to establish a common reference source for the local synchronization area and the remote synchronization area.

Example 7 includes the UE of Example 6, wherein the processing circuitry is further configured to receive, in a different subchannel of the UL subframe, timeslot or subframe, synchronization information from the second peer radio head. The processing circuitry is configured to derive, based on the synchronization information from the second peer radio head, the timing information for synchronizing the group of wireless communication devices in the local synchronization area.

Example 8 includes the UE of Example 7, wherein the processing circuitry is further configured to derive the timing information based on a time of arrival of the synchronization information in the different subchannel, timeslot or subframe.

Example 9 includes the UE of Example 6, wherein the processing circuitry is further configured to determine a round trip time for communicating signals between the first peer radio head and the second peer radio head and derive the timing information by compensating for propagation delay based on the round trip time.

Example 10 includes the UE of Example 7, wherein the processing circuitry is further configured to receive synchronization information from a third peer radio head, and determine timing grade information corresponding to propagation conditions and signal quality for the synchronization information from the second peer radio head and for the synchronization information from the third peer radio head. The processing circuitry is configured to select, based on at least one of the timing grade information and a synchronization hop count, whether to continue deriving the timing information based on the synchronization information from the second peer radio head or to start deriving the timing information based on the synchronization information from the third peer radio head.

Example 11 includes the UE of Example 1, wherein the subchannel of the UL subframe comprises a logical frequency subchannel associated with multiple physical resource blocks (PRBs) configured for frequency division multiplexing.

Example 12 includes the UE of Example 11, wherein the carrier resources are further divided into time slots or subframes for time division multiplexing.

Example 13 includes the UE of Example 1, further comprising a transceiver including transmitter and receiver components, multiple antennas, in which a first antenna of the multiple antennas is coupled to the transmitter, and in which a second antenna of the multiple antennas is coupled to the receiver, a display touchscreen, and a keyboard.

Example 14 is a method for synchronization of user equipment (UE) configured to communicate with a wireless cellular network. The method comprising determining that synchronization with and attachment to an evolved Node B (eNodeB) of the wireless cellular network is not currently available, and in response to the determination, scanning for and detecting a plurality of synchronization signals from corresponding peer radio heads. The method further includes measuring a signal quality for each of the plurality of synchronization signals, selecting a first synchronization signal of the plurality of synchronization signals based at least in part on the measured signal quality, and synchronizing a local timing source with the selected first synchronization signal.

Example 15 includes the method of Example 14, further comprising communicating with a first group of UEs based on synchronization with the first synchronization signal, and determining to extend, to a second group of UEs, the synchronization with the first synchronization signal. The method further includes, in response to the determination, periodically transmitting a second synchronization signal to the second group of UEs. The second synchronization signal comprising synchronization information derived from the synchronizing of the local timing source with the selected first synchronization signal.

Example 16 includes the method of Example 15, wherein determining to extend the synchronization with the first synchronization signal to the second group of UEs comprises one or more triggers selected from a group comprising detecting a presence of the second group of UEs, receiving a request for synchronization from at least one UE in the second group of UEs, and receiving a request or synchronization signal from a peer radio head corresponding to the first synchronization signal.

Example 17 includes the method of Example 14, further comprising detecting a subsequent availability of the eNodeB, and in response to the detected subsequent availability, ceasing synchronization with the first synchronization signal and attaching to the eNodeB.

Example 18 includes the method of Example 14, wherein determining that synchronization with and attachment to the eNodeB is not currently available comprises scanning downlink (DL) resources in an attempt to detect a cellular primary synchronization signal (PSS) and secondary synchronization signal (SSS) transmitted by the eNodeB, and determining that the PSS and SSS signals are not available from the eNodeB.

Example 19 includes the method of Example 14, wherein scanning for and detecting the plurality of synchronization signals comprises scanning uplink (UL) frequency subchannels over multiple subframes for the plurality of synchronization signals.

Example 20 includes the method of Example 14, wherein measuring the signal quality comprises measuring, for each detected synchronization signal, one or more parameter selected from a group comprising signal power, signal-to-interference-plus-noise ratio (SINR), a synchronization error, and a standard deviation of synchronization error.

Example 21 includes the method of Example 14, wherein selecting the first synchronization signal further comprises determining synchronization hop count, and determining, for each detected synchronization signal, timing grade information corresponding to propagation conditions and signal quality. The method further includes selecting the first synchronization signal based at least in part on the synchronization hop count and the timing grade information.

Example 22 is a UE comprising a wireless receiver, a local timer, a processor, and a wireless transmitter. The wireless receiver to receive, from a peer UE, synchronization information through a first frequency subchannel, time slot, or subframe. The processor to synchronize the local timer with the synchronization received through the first frequency subchannel, time slot, or subframe. The wireless transmitter to transmit the synchronization information through a second frequency subchannel, time slot, or subframe. The second frequency subchannel, timeslot, or subframe is different than the first frequency subchannel, time slot, or subframe.

Example 23 includes the UE of Example 22, further comprising measurement circuitry to determine a signal quality of the synchronization information received through the first frequency subchannel, time slot, or subframe.

Example 24 includes the UE of Example 22, wherein the processor is further configured to determine a number of hops between UEs within a synchronization the synchronization information made before being received by the peer UE, and receive timing grade information from the peer UE.

Example 25 includes the UE of Example 22, wherein the wireless receiver is further configured to receive a round trip time measurement for signals sent between the UE and the peer UE.

Example 26 is a UE to communicate with a wireless cellular network. The UE includes means for determining that synchronization with and attachment to an evolved Node B (eNodeB) of the wireless cellular network is not currently available, means for detecting, in response to the determination, a plurality of synchronization signals from corresponding peer radio heads, means for measuring a signal quality for each of the plurality of synchronization signals, means for selecting a first synchronization signal of the plurality of synchronization signals based at least in part on the measured signal quality, and means for synchronizing a local timing source with the selected first synchronization signal.

Example 27 includes the UE of Example 26, further comprising means for communicating with a first group of UEs based on synchronization with the first synchronization signal, means for determining to extend, to a second group of UEs, the synchronization with the first synchronization signal, and means for periodically transmitting, in response to the determination, a second synchronization signal to the second group of UEs. The second synchronization signal comprising synchronization information derived from the synchronizing of the local timing source with the selected first synchronization signal.

Example 28 includes the UE of Example 27, wherein determining to extend the synchronization with the first synchronization signal to the second group of UEs comprises one or more triggers selected from a group comprising detecting a presence of the second group of UEs, receiving a request for synchronization from at least one UE in the second group of UEs, and receiving a request or synchronization signal from a peer radio head corresponding to the first synchronization signal.

Example 29 is a computer program product comprising a computer readable storage medium having a computer readable program code embodied therein. The computer readable program code adapted to be executed to implement a method comprising determining that synchronization of user equipment with an evolved Node B (eNodeB) of a wireless cellular network is not currently available, and in response to the determination, scanning for and detecting a plurality of synchronization signals from corresponding peer radio heads. The method further includes measuring a signal quality for each of the plurality of synchronization signals, selecting a first synchronization signal of the plurality of synchronization signals based at least in part on the measured signal quality, and synchronizing a local timing source with the selected first synchronization signal.

Example 30. The computer program product of Example 29, wherein the method further comprises communicating with a first group of UEs based on synchronization with the first synchronization signal, determining to extend, to a second group of UEs, the synchronization with the first synchronization signal, and in response to the determination, periodically transmitting a second synchronization signal to the second group of UEs. The second synchronization signal comprising synchronization information derived from the synchronizing of the local timing source with the selected first synchronization signal.

Example 31 includes the computer program product of Example 30, wherein determining to extend the synchronization with the first synchronization signal to the second group of UEs comprises one or more triggers selected from a group comprising detecting a presence of the second group of UEs, receiving a request for synchronization from at least one UE in the second group of UEs, and receiving a request or synchronization signal from a peer radio head corresponding to the first synchronization signal.

Example 32 includes the computer program product of Example 29, wherein the method further comprises detecting a subsequent availability of the eNodeB, and in response to the detected subsequent availability, ceasing synchronization with the first synchronization signal and attaching to the eNodeB.

Example 33 includes the computer program product of Example 29, wherein determining that synchronization with and attachment to the eNodeB is not currently available comprises scanning downlink (DL) resources in an attempt to detect a cellular primary synchronization signal (PSS) and secondary synchronization signal (SSS) transmitted by the eNodeB, and determining that the PSS and SSS signals are not available from the eNodeB.

Example 34 includes the computer program product of Example 29, wherein scanning for and detecting the plurality of synchronization signals comprises scanning uplink (UL) frequency subchannels over multiple subframes for the plurality of synchronization signals.

Example 35 includes the computer program product of Example 29, wherein measuring the signal quality comprises measuring, for each detected synchronization signal, one or more parameter selected from a group comprising signal power, signal-to-interference-plus-noise ratio (SINR), a synchronization error, and a standard deviation of synchronization error.

Example 36 includes the computer program product of Example 29, wherein selecting the first synchronization signal further comprises determining a synchronization hop count, determining, for each detected synchronization signal, timing grade information corresponding to propagation conditions and signal quality, and selecting the first synchronization signal based at least in part on the synchronization hop count and the timing grade information.

Example 37 is an apparatus comprising means to perform a method as discussed in any one of Examples 14-21.

Example 38 is a machine-readable storage including machine-readable instructions, when executed, to implement a method or realize an apparatus or UE, as discussed in any preceding Example.

Example 39 is a machine readable medium including code, when executed, to cause a machine to perform the method of any one of Examples 14-21.

Various techniques disclosed herein, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

It will be understood by those having skill in the art that many changes may be made to the details of the above-described embodiments without departing from the underlying principles of the invention. The scope of the present invention should, therefore, be determined only by the following claims.

The invention claimed is:

1. User equipment (UE) comprising processing circuitry to:
    select a subchannel of an uplink (UL) subframe for device-to-device (D2D) communication, the subchannel of the UL subframe corresponding to carrier resources of an evolved universal terrestrial radio access network (E-UTRAN);
    generate timing information for synchronizing a group of wireless communication devices with the UE in a local synchronization area; and
    transmit, in the selected subchannel of the UL subframe, a synchronization signal comprising the timing information,
    wherein the subchannel of the UL subframe comprises a logical frequency subchannel associated with multiple physical resource blocks (PRBs) configured for frequency division multiplexing.

2. The UE of claim 1, wherein the processing circuitry is further configured to:
    receive, from a first wireless communication device in the group, a signal indicating detection of a second wireless communication device outside of the local synchronization area; and
    in response to the signal, send a request to the first wireless communication device to extend the local synchronization area by retransmitting the synchronization signal, wherein the UE becomes an independent synchronization source and the first wireless communication device becomes a regional synchronization source that depends from deriving synchronization from the UE.

3. The UE of claim 1, wherein the processing circuitry is further configured to:
    receive, from a first wireless communication device in the group, a signal indicating detection of a second wireless communication device outside of the local synchronization area, and that the first wireless communication device autonomously extends the local synchronization area by retransmitting the synchronization signal, wherein the UE becomes an independent synchronization source and the first wireless communication device becomes a regional synchronization source that depends from deriving synchronization from the UE.

4. The UE of claim 1, wherein the processing circuitry is further configured to:
    receive, from a first wireless communication device in the group, a request to change the selected subchannel to a different subchannel, timeslot, or subframe to avoid interference with a remote synchronization area that at least partially overlaps with the local synchronization area; and
    in response to the request, change transmission of the synchronization signal to the different subchannel, timeslot, or subframe.

5. The UE of claim 1, wherein the processing circuitry is further configured to:
    determine interference with a remote synchronization area that at least partially overlaps with the local synchronization area; and
    autonomously change transmission of the synchronization signal to a different subchannel, timeslot or subframe.

6. The UE of claim 1, wherein the UE is a first peer radio head configured as a first reference source in the local synchronization area, and wherein the processing circuitry is further configured to:
    detect entry of a second peer radio head into the local synchronization area, the second peer radio head configured as a second reference source in a remote synchronization area; and
    synchronize with the second radio head to establish a common reference source for the local synchronization area and the remote synchronization area.

7. The UE of claim 6, wherein the processing circuitry is further configured to:
    receive, in a different subchannel of the UL subframe, timeslot or subframe, synchronization information from the second peer radio head; and
    derive, based on the synchronization information from the second peer radio head, the timing information for synchronizing the group of wireless communication devices in the local synchronization area.

8. The UE of claim 7, wherein the processing circuitry is further configured to:

derive the timing information based on a time of arrival of the synchronization information in the different subchannel, timeslot or subframe.

9. The UE of claim 6, wherein the processing circuitry is further configured to:
- determine a round trip time for communicating signals between the first peer radio head and the second peer radio head; and
- derive the timing information by compensating for propagation delay based on the round trip time.

10. The UE of claim 7, wherein the processing circuitry is further configured to:
- receive synchronization information from a third peer radio head;
- determine timing grade information corresponding to propagation conditions and signal quality for the synchronization information from the second peer radio head and for the synchronization information from the third peer radio head; and
- select, based on at least one of the timing grade information and a synchronization hop count, whether to continue deriving the timing information based on the synchronization information from the second peer radio head or to start deriving the timing information based on the synchronization information from the third peer radio head.

11. The UE of claim 1, wherein the carrier resources are further divided into time slots or subframes for time division multiplexing.

12. The UE of claim 1, further comprising:
- a transceiver including transmitter and receiver components;
- multiple antennas, in which a first antenna of the multiple antennas is coupled to the transmitter, and in which a second antenna of the multiple antennas is coupled to the receiver;
- a display touchscreen; and
- a keyboard.

13. User equipment (UE) comprising processing circuitry to:
- select a subchannel of an uplink (UL) subframe for device-to-device (D2D) communication, the subchannel of the UL subframe corresponding to carrier resources of an evolved universal terrestrial radio access network (E-UTRAN);
- generate timing information for synchronizing a group of wireless communication devices with the UE in a local synchronization area;
- transmit, in the selected subchannel of the UL subframe, a synchronization signal comprising the timing information;
- receive, from a first wireless communication device in the group, a signal indicating detection of a second wireless communication device outside of the local synchronization area; and
- in response to the signal, send a request to the first wireless communication device to extend the local synchronization area by retransmitting the synchronization signal, wherein the UE becomes an independent synchronization source and the first wireless communication device becomes a regional synchronization source that depends from deriving synchronization from the UE.

14. The UE of claim 13, wherein the subchannel of the UL subframe comprises a logical frequency subchannel associated with multiple physical resource blocks (PRBs) configured for frequency division multiplexing.

15. The UE of claim 14, wherein the carrier resources are further divided into time slots or subframes for time division multiplexing.

16. User equipment (UE) comprising processing circuitry to:
- select a subchannel of an uplink (UL) subframe for device-to-device (D2D) communication, the subchannel of the UL subframe corresponding to carrier resources of an evolved universal terrestrial radio access network (E-UTRAN);
- generate timing information for synchronizing a group of wireless communication devices with the UE in a local synchronization area;
- transmit, in the selected subchannel of the UL subframe, a synchronization signal comprising the timing information; and
- receive, from a first wireless communication device in the group, a signal indicating detection of a second wireless communication device outside of the local synchronization area, and that the first wireless communication device autonomously extends the local synchronization area by retransmitting the synchronization signal, wherein the UE becomes an independent synchronization source and the first wireless communication device becomes a regional synchronization source that depends from deriving synchronization from the UE.

17. The UE of claim 16, wherein the subchannel of the UL subframe comprises a logical frequency subchannel associated with multiple physical resource blocks (PRBs) configured for frequency division multiplexing.

18. The UE of claim 17, wherein the carrier resources are further divided into time slots or subframes for time division multiplexing.

19. User equipment (UE) comprising processing circuitry to:
- select a subchannel of an uplink (UL) subframe for device-to-device (D2D) communication, the subchannel of the UL subframe corresponding to carrier resources of an evolved universal terrestrial radio access network (E-UTRAN);
- generate timing information for synchronizing a group of wireless communication devices with the UE in a local synchronization area;
- transmit, in the selected subchannel of the UL subframe, a synchronization signal comprising the timing information;
- receive, from a first wireless communication device in the group, a request to change the selected subchannel to a different subchannel, timeslot, or subframe to avoid interference with a remote synchronization area that at least partially overlaps with the local synchronization area; and
- in response to the request, change transmission of the synchronization signal to the different subchannel, timeslot, or subframe.

20. The UE of claim 19, wherein the UE is a first peer radio head configured as a first reference source in the local synchronization area, and wherein the processing circuitry is further configured to:
- detect entry of a second peer radio head into the local synchronization area, the second peer radio head configured as a second reference source in a remote synchronization area; and
- synchronize with the second radio head to establish a common reference source for the local synchronization area and the remote synchronization area.

21. The UE of claim 20, wherein the processing circuitry is further configured to:
- receive, in a different subchannel of the UL subframe, timeslot or subframe, synchronization information from the second peer radio head; and
- derive, based on the synchronization information from the second peer radio head, the timing information for synchronizing the group of wireless communication devices in the local synchronization area.

22. The UE of claim 21 wherein the processing circuitry is further configured to:
- derive the timing information based on a time of arrival of the synchronization information in the different subchannel, timeslot or subframe.

23. The UE of claim 20, wherein the processing circuitry is further configured to:
- determine a round trip time for communicating signals between the first peer radio head and the second peer radio head; and
- derive the timing information by compensating for propagation delay based on the round trip time.

24. The UE of claim 21, wherein the processing circuitry is further configured to:
- receive synchronization information from a third peer radio head;
- determine timing grade information corresponding to propagation conditions and signal quality for the synchronization information from the second peer radio head and for the synchronization information from the third peer radio head; and
- select, based on at least one of the timing grade information and a synchronization hop count, whether to continue deriving the timing information based on the synchronization information from the second peer radio head or to start deriving the timing information based on the synchronization information from the third peer radio head.

25. User equipment (UE) comprising processing circuitry to:
- select a subchannel of an uplink (UL) subframe for device-to-device (D2D) communication, the subchannel of the UL subframe corresponding to carrier resources of an evolved universal terrestrial radio access network (E-UTRAN);
- generate timing information for synchronizing a group of wireless communication devices with the UE in a local synchronization area;
- transmit, in the selected subchannel of the UL subframe, a synchronization signal comprising the timing information;
- determine interference with a remote synchronization area that at least partially overlaps with the local synchronization area; and
- autonomously change transmission of the synchronization signal to a different subchannel, timeslot or subframe.

* * * * *